United States Patent [19]

Acuna

[11] Patent Number: 5,006,264

[45] Date of Patent: Apr. 9, 1991

[54] APPARATUSES AND METHODS FOR LIQUID-UNDISSOLVED-SOLIDS SEPARATION

[76] Inventor: Eduardo M. Acuna, Paseo de los Descubridores 216 4° Sector, Monterrey, N.L.C.P., Mexico, 64610

[21] Appl. No.: 219,294

[22] Filed: Jul. 14, 1988

Related U.S. Application Data

[63] Continuation-in-part of Ser. No. 892,995, Aug. 4, 1986, Pat. No. 4,759,857.

[51] Int. Cl.[5] ............ B01D 1/00

[52] U.S. Cl. ............ 210/741; 210/742; 210/767; 210/776; 210/220; 210/416.1; 210/496

[58] Field of Search ............ 210/741, 742, 767, 776, 210/416.1, 496, 508, 220

[56] References Cited

U.S. PATENT DOCUMENTS

| | | | |
|---|---|---|---|
| 51,611 | 12/1865 | Noyes | 431/325 |
| 409,071 | 8/1889 | Slevin | 210/242.1 |
| 622,562 | 4/1899 | Sutton | 210/413 |
| 628,088 | 7/1899 | Giles | 210/249 |
| 676,121 | 6/1901 | Busenbenz | 137/140 |
| 752,575 | 2/1904 | Mosher | 431/325 |
| 1,556,732 | 10/1925 | Sterrick | 137/140 |
| 2,457,851 | 1/1949 | Taft | 62/1 |
| 2,515,569 | 7/1950 | Pozun | 4/225 |
| 2,520,056 | 8/1950 | Pozun | 4/228 |
| 2,770,492 | 11/1956 | Kuss | 229/20 |
| 3,236,757 | 2/1966 | Litt | 204/149 |
| 3,236,768 | 2/1966 | Litt | 210/636 |
| 3,266,630 | 8/1966 | Litt | 210/404 |
| 3,977,364 | 8/1976 | Gijsbers et al. | 122/366 |
| 4,126,556 | 11/1978 | Swanson et al. | 210/242 |
| 4,280,658 | 7/1981 | Ehrrich | 239/6 |
| 4,286,754 | 9/1981 | Jones | 239/6 |
| 4,316,805 | 2/1982 | Faust et al. | 210/748 |
| 4,759,857 | 7/1988 | Acuna | 210/741 |

FOREIGN PATENT DOCUMENTS

| | | |
|---|---|---|
| 7506932 | 6/1976 | Brazil . |
| 0151565 | 11/1979 | Japan . |
| 011056 | 1/1980 | Japan . |
| 116419 | 9/1980 | Japan . |

OTHER PUBLICATIONS

J. S. Watson et al. "A Radioisotopic Tracer Method for Measurement of Solids Concentration of Settling Bed of Solids" Feb. 1986 pp. 200–206.

Gruesbeck and Collins, "Entrainment and Deposition of Fine Particles in Porous Media" 12/1982 pp. 847–856.

Sollee et al. "Field Application of Clean Completion Fluid" 9/85 pp. 1–72.

The Filterite, Cartridge Filtration Guide, A Technical Guide to Better Filtration, Brunswick Technetics 10/80.

*Primary Examiner*—W. Gary Jones

*Attorney, Agent, or Firm*—Vaden, Eickenroht, Thompson & Boulware

[57] ABSTRACT

Liquid purification apparatuses and methods; an open filtration, treatment and siphon apparatus and process; a porous mass formation apparatus and process; and a liquid-solid separation apparatus and a process using a siphon member. In one embodiment, a liquid or liquid containing mass, gel, or mud having solids is contained in or introduced into an upper vessel. The liquid and particles of undissolved solids are drawn away from the upper vessel by siphonage. Particles of solids may either settle to the bottom of the upper vessel, remain in the liquid or mass, or float to the top of the surface in the upper vessel. Particles of undissolved solids may be deposited in a siphon member of porous media as the liquid and particles of undissolved solids flow through the porous media. In one embodiment an open siphon may be used having multiple layers of material of differing pore size; of alternating pore size; of successively smaller pore size from the center outwardly or vice versa; or different materials in different locations; or of successively larger pore size from the center outwardly or vice-versa. In another embodiment a bowl-shaped member formed of porous material may be emplaced in liquid to be filtered and transmitted and liquid flowing through and into the bowl-shaped member may be pumped out or siphoned off using a siphon member of porous media.

3 Claims, 12 Drawing Sheets

FIG. 2
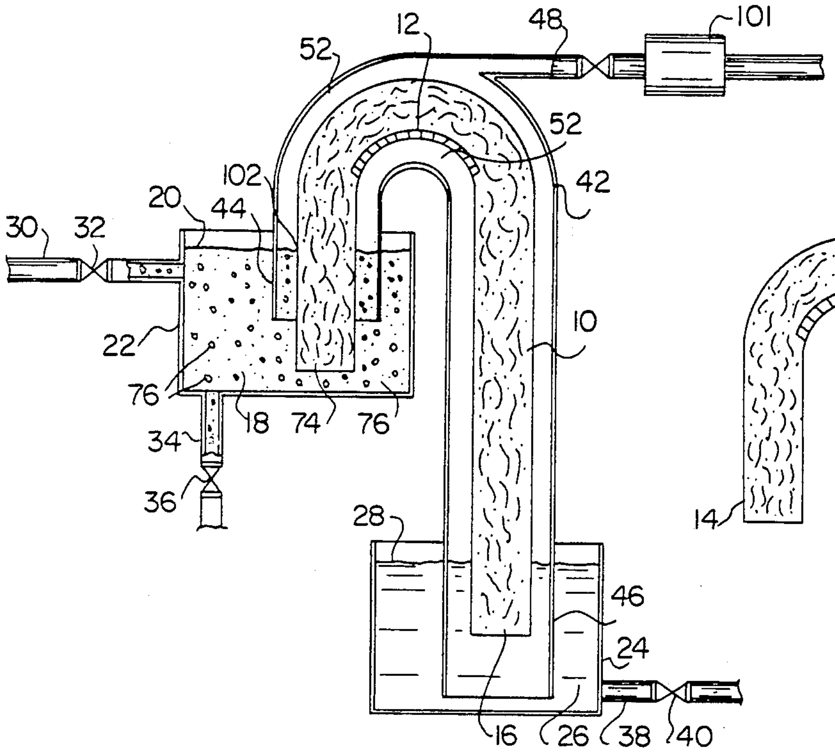
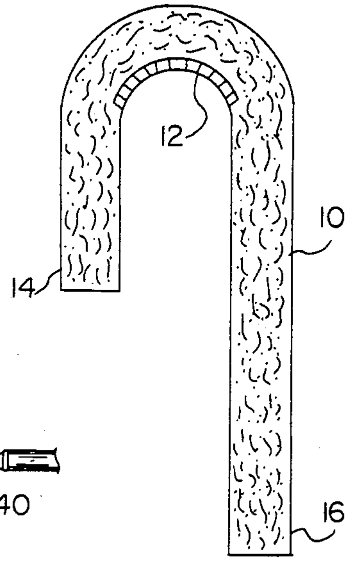
FIG. 3
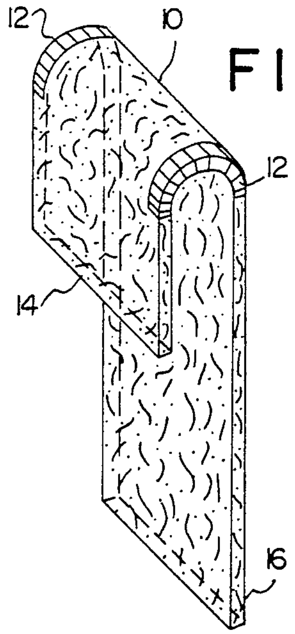
FIG. 4
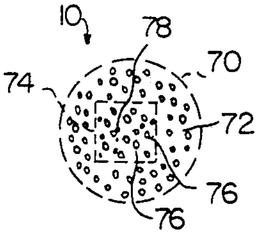
FIG. 6
FIG. 5
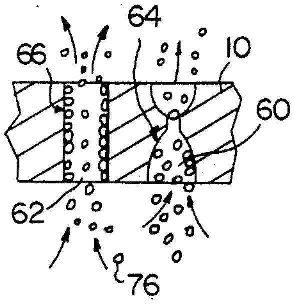

| um | INFLUENT(%) | EFFLUENT % 90 MIN (%) |
|---|---|---|
| 1-5 | 75.5 | 100 |
| 5-15 | 21.8 | - |
| 15-25 | 2.5 | - |
| 25-50 | 0.3 | - |
| 50+ | <0.3 | - |

APPARATUSES AND METHODS FOR LIQUID-UNDISSOLVED-SOLIDS SEPARATION

This application is a continuation-in-part of Patent Application Ser. No. 06/892,995, filed Aug. 4, 1986, now U.S. Pat. No. 4,759,857.

BACKGROUND OF THE INVENTION

1. Field of the Invention

This invention relates generally to: apparatuses for the separation of undissolved solids from liquids containing them; liquid purification; to open siphons for liquids, to open siphon filters for liquid/solid separation by filtration using a porous filter medium; to liquid purification devices; to liquid cooling devices; to biological organism filtration or separation devices; to microbiological organism filtration or separation devices; to devices for radiating liquid or liquid with entrained or dissolved solids; to radiation detection devices; to devices for purifying liquids with undissolved solids suspended therein or which float to the top of the liquid; and to processes related to the use of each of these apparatuses.

Liquid-solid separations filtrations, and purifications are important in industry, medicine and the sciences. Such process and apparatus can be divided into two broad categories: (a) those directed to liquid and dissolved solids, and (b) those directed to liquids and undissolved solids. This invention provides, inter alia, a process and apparatus for separating liquid and undissolved solids and a process and apparatus for open siphons for liquids.

2. Description of the Prior Art

Prior art filtration apparatuses are classified as either surface type filters or depth type filters. Surface type filters main filtration mechanism is the direct interception of contaminant particles by filter media which causes an unwanted cake or plug to develop on the filter media. Depth type filters main filtration mechanisms are: (a) direct interception; (b) inertial impaction; or (c) diffusional interception—all of which cause filter media clogging which obstructs (or may eventually prevent) liquid flow, requiring filter media cleaning, removal, or replacement. In these types of prior art filtration, the liquid to be filtered must be moved through the filter media and the contaminant particles must be moved to the filter media in the liquid. The liquid-contaminant mixture is moved across the filter media by means of a differential pressure so that the media can intercept and hold the contaminant particles.

Prior art open siphons are slow and inefficient. With regard to filters, the prior art shows many types, but the prior art known to applicant discloses only processes or apparatuses for which "cake" formation by undissolved solids is a major problem. Cake formations in prior art filters obstruct liquid flow and require cleaning, backwashing, or backflushing, or complete filter element replacement. Traditional filters for undissolved solids have problems caused by clogging or by the formation of a cake of the undissolved solids. The solids or cake clogs the filter and reduces liquid flow. This requires either higher pressures to force liquid past the cake, or mechanisms for mechanical vibration of the filters to dislodge the cake and high pressure air cleaning. Some filters use a backwash or backflush process to dislodge the cake. Eventually clogged filter elements are replaced. Many prior art filters cannot tolerate liquids with a high concentration of solids.

The prior art concept of filtration requires that the filter media stop and hold the contaminants to be filtered. In other words, prior art filters must clog or cake to some extent to provide filtration. Hence, prior art filters must be cleaned or replaced. There is no alternative if they are to provide filtration.

Another concept equally important to prior art filtration is that the fluid to be filtered is forced under pressure through the filter media. This forcing is necessary because as the filter media stops and holds more and more contaminants, more force is required to assure flow of the fluid through the filter. The liquid to be filtered is forced through the filter at a relatively high velocity. The filtered matter is held by the filter material. The velocity of the liquid is sufficient to impart considerable momentum to the contaminant material particles. According to classic filtration principles all the fluid to be filtered must pass through the filter media and all the contaminant particles must pass into and be held by the filter media. In short, prior art filtration requires plugging or caking and forced fluid flow.

Siphons can be classified in two categories: (a) closed siphons and (b) open siphons.

Closed siphons such as conduits, pipes, or housings have walls through which liquid will not pass and are usually configured in an inverted U-shape with an intake end and a discharge end. A hydraulic gradient created by the difference in levels between the intake end and the discharge end causes liquid to flow through the siphon. One drawback of a closed siphon is that its action can be reduced or completely shut-off by the formation of an air pocket within the siphon. In any closed siphon in which the siphon wall extends beneath the surface of a fluid to be siphoned, a pressure differential exists between the surface of the liquid and the siphon intake. Due to this pressure differential there is forced flow of the liquid into the siphon intake which will contribute to the compression of contaminants at the intake.

Open siphons are characterized by the absence of a pre-defined conduit acting as a siphon. Nevertheless, the intake end of an open siphon must pass through the plane of the surface of the liquid. The liquid does not have to be transported further above the liquid surface level by the siphon, but the siphon should intersect the interface between the surface of the liquid and the gas above the liquid. The porous medium is the scaffolding inside of which an envelope of liquid forms. The medium contains multiple interconnected passages. The liquid flows through the medium by siphonage. Above the liquid, the porous medium contacts a gas phase such as vapor of the same liquid, atmospheric gas, or other gases or vapors.

Although normally one would prime the siphon by saturating the porous medium, this is not necessary. Porous media can self-prime. Capillary action raises liquid from the surface of the reservoir into the porous media. Once liquid reaches the top portion, (a very slow process by capillary action) gravity will pull the liquid down toward the outlet end of the medium. At this point, capillary action is overcome by siphonage and liquid flow increases.

The prior art shows apparatus which use porous media for moving, transferring, supplying, or dispensing liquids to lower levels by siphonage. Examples of porous media are: bundles of fibers, matted fibrous or filamentous material, micro-porous membranes, and sorbent material. See U.S. Pat. Nos. 2,770,492; 2,515,569; 2,520,056; and 2,457,851. However, these patents do not deal in any way with filtering or liquid solid separation. They do not address the problem of filtering, they do not solve the problems of filtering, and they do not teach selecting a porous medium that is related to excluding undissolved solids of a given size.

U.S. Pat. No. 4,280,658 to Ehrrich discloses a process and apparatus for liquid cleaning through capillary action. However, Ehrrich does not teach or deal with the separation action of the present invention. His device transports liquid with siphonage, but it filters with capillary action. Filtration takes place at the second vessel where the micro-porous membrane is placed. Capillary action, not siphonage, filters the liquid as it travels through the membrane from the bottom to the surface where it is evaporated. No hydraulic gradient is involved during filtration in Ehrrich's invention.

U.S. Pat. No. 4,126,556 to Swanson discloses an apparatus for removal of an immersed liquid from a liquid mixture. A porous material capable of absorbing the liquid to be separated is positioned as a siphon, and that specific liquid is removed. Although employing the structure of an open siphon, Swanson uses a system capable of siphonage only for transportation. He does not remove solids from a mixture of liquids; he removes one liquid chemical from a mixture of liquid chemicals by using a chemically specific wick. (See column 7, line 1-5) Swanson does not suggest separating all liquids from undissolved solids by using the same medium, nor does he deal with any of the clogging problems found with traditional filters.

U.S. Pat. No. 3,236,768 to Litt discloses a structure which could be taken as an open siphon filter, but it does not suggest or teach the present invention. Litt discloses a process for water purification using a capillary lattice. The lattice in Litt comprises a body or mass which is compacted enough not to have any passages of a size which serve merely as siphon conduits. Water, by capillary diffusion and under gravity, moves inwardly and downwardly through the lattice leaving behind ions collected on the lattice's faces. The lattice is a matted filamentous material compacted so much that it eliminates any passages capable of serving as a siphon conduit. Additionally, Litt deals with separation of ionic particles, i.e., dissolved solids. He never suggests to apply his invention for separation of undissolved solids. He expressly states that heavy or gross solids can be removed by conventional mechanical filters (see for example, column 2, lines 41-44 and column 3, lines 33-35).

The art knows closed siphon filters for liquid purification or separation; for example an abstract obtained of Japanese Patent No. 55116419 dated 80-09-08 describes a method for producing a filtering element for filtering liquids. That patent teaches capillary forming raw material charged in a straight pipe, bent into a U-shape and placed to form an inverted U-shaped solid siphon pipe. Also, Japanese Patent Nos. 55011056 dated 80-01-25 and 54151565 dated 79-11-28 describe closed capillary filters comprising a number of tubes dipped at one end into a bath of liquid to be filtered, each of the tubes being packed by a bundle of filaments to draw the liquid from the bath into the tube by capillary action. They do not disclose open siphon filters.

U.S. Pat. No. 3,236,757 to Litt discloses a method and apparatus for water reclamation which employ a wick which is either substantially or entirely contained within a closed conduit. The wick acts by capillary diffusion to conduct water from one vessel to another. This patent contains no teachings or suggestions regarding siphonage or filtration.

U.S. Pat. No. 3,977,364 to Gijsbers et al discloses an apparatus for evaporating liquids which uses a porous layer acting as a siphon to draw up liquid from a receptacle. This patent contains no teachings regarding filtration.

Closed siphon filters present the same drawbacks as conventional filters. In those filters, a cake of undissolved solid particles is formed at the intake end of the closed siphon, which can plug the closed siphon and obstruct or prevent liquid flow. Consequently, such filters need frequent cleaning and cake removal. The pressure difference obtained by the hydraulic gradient of a siphon makes the closed siphon filter unsuitable for many applications since the cake requires higher pressure differentials for liquid flow. The pressure losses through the cake at the intake end can stop the siphoning action. Conventional filters require pumps or vacuums to create pressure differences high enough to force liquid past clogged areas or cake areas.

SUMMARY OF THE INVENTION

This invention is directed, inter alia, to an open siphon filter; to a process for an open siphon filter; to apparatuses and processes to liquid purification; to liquid treatment; and to separation of liquids and undissolved solids comprising a means for drawing liquid into a porous medium containing internal interconnected passageways at least partially by capillary action and then flowing it through those passageways, leaving some or all of the undissolved solids behind. The porous medium intersects the interface between the liquid and the gas above the surface of the liquid. This invention is also directed to a process and apparatus for utilizing an agglomerated mass of the contaminants themselves as a liquid transport and filtration medium.

No matter how deep the porous medium is placed, liquid approaches the porous medium in a laminar fashion along the region of the interface. As the liquid enters the medium and is drawn away by the internal interconnected passageways, some or all of the particles which are too large pass through the passageways, stop, and begin to form a permeable mass near the surface of the porous medium.

The permeable mass does not hinder liquid flow as in prior filters. Either a totally open siphon is used or a siphon member is used within an enclosure which is relatively larger than the siphon member so that the siphon member acts as an open siphon within the enclosure. Since the porous medium is not confined by a closed wall conduit at the interface between the liquid and the gas above, the liquid is able to continuously wet the permeable mass (even if it bulges above the normal surface level of the liquid) due (it is believed) to surface tension phenomenon.

In some embodiments, the permeable mass is also loosely formed due to slow flow rates. Therefore, the liquid is able to pass over the permeable mass by wetting it and the liquid is able to pass through the permeable mass since the permeable mass is not tightly packed. In fact, the permeable mass acts like a porous medium or like a barrier to other contaminant particles. In one embodiment, once enough of the permeable mass is formed, all or part of it can fall away to the bottom of the reservoir containing the liquid - thus yielding a self cleaning filter. In another embodiment a relatively shallow vessel can be employed and the permeable mass can be formed in such a manner that it contacts the edge of the open siphon and then builds up in the area near the open siphon. In another embodiment in which the velocity of the liquid moving toward, to, and through the porous medium is relatively slow, some contaminant particles never achieve sufficient momentum to move toward either the permeable mass or the porous medium. They simply settle down in the container—the porous medium never has to contend with or process such particles.

In embodiments of the invention which deal with solids which sink in the containment vessel, the laminar flow can take advantage of natural sedimentation phenomena (although the present invention is not limited to embodiments in which sedimentation occurs nor to embodiments which take advantage of sedimentation phenomena). Due to this phenomena, the region of the interface between the liquid and gas (i.e., the uppermost layers in the reservoir) are the cleanest. See the following reference which is incorporated herein. J. S. Watson, et al., "RADIOSOTOPIC TRACER OF MEASURING OF SOLIDS CONCENTRATION IN A SETTLE BED OF SOLIDS", *AICHE Journal* (Volume 32, No. 2) 200 (1986). It should be noted that although the invention can take advantage of the natural sedimentation phenomena by the laminar flow extraction of the fluid, the invention will function in turbulent applications; that is, the permeable mass formation, wetting and cleaning described above does not depend on sedimentation. Also, the present invention can be used to advantage in situations in which undissolved solids float on or to the top of a liquid.

Flow through the porous medium can be enhanced by attaching one end of a closed wall conduit to the porous medium (in the same manner as the pump would be attached) and placing the other end of the closed wall conduit outside of and lower than the level of the liquid. Filling the conduit creates a hydraulic gradient which will apply the proper pressure to the porous medium. Another manner to achieve flow is to form the porous medium such that some portion of it is outside of and lower than the surface of the liquid. The porous medium will self-prime, or it can be saturated to create the hydraulic gradient. Flow can also be achieved by forming the porous medium in the shape of a bowl and partially immersing it in the liquid. Liquid will pass over and through the cake along the interface toward the interior or the "bowl". The liquid may be removed from the interior of the "bowl" by drain means or by other liquid removing or pumping means. "Porous medium" is meant very broadly to include any porous material, including but not limited to materials in the form of granules, fibers, fibrils, sheets, fabric, bars, rods,; and including but not limited to metal fibers or fibrils, hardened porous materials such as clay, ceramics, cermets, cememts; and including but not limited to organic or inorganic material.

Models of how the liquid flows in the porous media have been developed. (See the following reference which is incorporated herein for all purposes, C. C. Gruesbeck and R. E. Collins, "ENTRAINMENT AND DEPOSITION OF FINE PARTICLES IN POROUS MEDIA", *Society of Petroleum Engineers Journal*, December 1982.)

One model of particulate entrainment in porous media with a horizontal structure suggests that in such media there are two parallel pathways: "plugging pathways" and "non-plugging pathways". As liquid enters the porous medium, the large "undesirable" particles stop and form the cake, thereby being removed. Smaller particles pass into the medium. The particles which enter the plugging pathways clog the narrow neck of the pathway and stop liquid flow. The model of the pathways is based on a horizontal structure in which a reverse flow unplugs the plugged pathways and allows liquid to again flow until the particles re-plug the pathway neck.

Although Applicant does not wish to be restricted to any theory of operation, Applicant believes that a similar phenomenon occurs in devices according to his invention. As the flow stops in the plugging pathways, the particles drop away from the neck and liquid flows again. As liquid flows more rapidly through the neck, the particles again clog the neck and liquid again stops. This cycle will continue during the filtering process. In the non-plugging pathways, the small particles deposit along the sides until a layer of particles form. Thereafter, the particles pass through the medium.

Another advantage of the present invention is that the gas atmosphere in contact with the liquid and porous medium may be isolated and thereby controlled. For example, the pressure can be set higher or lower than atmospheric pressure, to enhance flow rate, minimize evaporation or avoid liquid oxidation through use of an inner gas. Temperature may be controlled, and the atmosphere can be sterilized for medical or biological applications. Also, the reservoir, porous medium, and any liquid collector may be enclosed so that the temperature, composition and pressure surrounding the apparatus may be controlled and the temperature of the liquid itself may be controlled or changed. An open siphon according to the present invention is not subject to the deleterious effects of air pockets which can reduce or shutoff flow in a closed siphon. Consequently, more uniform and constant flow can be achieved. Flow with extremely low pressure differential and relatively low velocity is possible.

These and many other advantages and features of the present invention provide significant improved results in open siphons in separation apparatuses, and in liquid-solid purification and separation. Apparatuses and processes taught herein can be used for the siphoning, purification, separation, and filtration of non-connate liquids in fluid-containing masses such as gels or muds.

The present invention is particularly suited for use in the filtration of oil well drilling and completion fluids. Completion fluids are essentially water with dissolved solids such as calcium chloride, sodium chloride, zinc bromide, etc., the dissolved solids provide the fluid with important characteristics needed in completion operations. Undissolved solids can plug the perforation channels of the well and the porous structure of the reservoir, damaging the formation and causing a decrease in well productivity.

Oil technology literature recommends that a number of steps be taken to enhance the filtration of these fluids. (See for example the following references which are incorporated herein for all purposes: S. S. Sollee, T. D. Elson, and M. K. Lerma, "FIELD APPLICATION OF CLEAN COMPLETION FLUIDS", presented at the 60th Annual Technical Conference and Exhibition of the Society of Petroleum Engineers, held in Las Vegas, Nev., Sept. 22–25, 1985. N. H. Ammerer, R. Hashemi, and J. E. Jewell, "COMPLETION FLUIDS: A GENERIC OVERVIEW", Parts 1, 2, and 3, *Drilling, the Well Site Publication,* May 1983, June 1983, and August 1983. Sharp, K.W and Alan, P. T., "FILTRATION OF OIL FIELD BRINES: A CONCEPTUAL OVERVIEW", SPE 10657 Presented at 1982 Formation Damage Control Symposium, Lafayette, March 24–25. Sparlin, D. and Guidry, J. P, "STUDY OF FILTERS USED FOR FILTERING WORK OVER FLUIDS", SPE 7005 Presented at 1978 Formation Damage Control Symposium, Lafayette, February 13–16.).

Filtration of oil well fluids involves lengthy and complicated processes. The equipment needed can include: a shaker, settling tank, desilter, centrifugal separator, and final polishing filters. These polishing filters combine absolute cartridge filters and diatomaceous earth filters. These solid removal systems have very high capital and operating costs as well as high maintenance costs because these filters build up a cake of solids in the filter media that must be removed periodically. Additionally, these filters require costly powerful pumps for use in extensive fluid handling under high pressures.

The present invention can be practiced without numerous particle removal steps; with or without the use of pumps; and it provides a "one pass" capability which produces an equal or better filtered effluent with a longer service period than conventional systems. This invention's longer service period occurs because it operates mainly as a non-plugging or surface deposit type filter. Since it is non-plugging, a finite flow through the medium will always exist. It is believed that the entrained particles that pass through the filter have a size small enough to accomplish most requirements for industrial applications. Some embodiments of open siphon filters according to the present invention provide filtration of fluids with very high concentrations of undissolved solids and some provide filtering action nearly independent of the solids concentrations.

From the above-mentioned references relating to filtration of oil field completion fluids, the following data compare the performance of this invention in this particular application:

INFLUENT LOAD TO POLISHING FILTERS: 1,000 ppm/max

INFLUENT LOAD TO CURRENT FILTERS: 500 ppm

INFLUENT LOAD TO PRESENT INVENTION: 1,500 ppm

EFFLUENT TURBIDITY ACCEPTABLE: 30 NTU/max

EFFLUENT TURBIDITY CURRENT FILTERS: 8 NTU to 72 NTU

EFFLUENT TURBIDITY PRESENT INVENTION: Less than 1 NTU

SERVICE PERIOD CURRENT FILTERS: 16–30 minutes

SERVICE PERIOD PRESENT INVENTION: 30 hours

[Data from: "DESIGN AND DEVELOPMENT OF A CAPILLARY SIPHON FILTER FOR OIL FIELD BRINES", University of Texas at Austin, Department of Mechanical Engineering, Mechanical Engineering Design Project, Summer 1985. Experiments conducted by the university were intended to demonstrate the technical feasibility of liquid-solid separation processes and apparatus according to the present invention.]

This invention goes contrary to the prior art's teachings that plugging and forced fluid flow are necessary for filtration. It also provides a process and apparatus which can use the contaminants to be filtered themselves to advantage in accomplishing filtration. Since according to the present invention the fluid to be purified need not be forced through the filter media, the contaminants do not form a compressed cake or tightly packed clogged area, thereby rendering the permeable mass or clogged areas sufficiently porous to permit continued flow therethrough and to accomplish some filtration. These aspects results in more efficient use of a given amount of filter media and in a substantial reduction in energy requirements for filter operations. A device according to the present invention achieves filtration without injurious plugging of the filter media.

Rather than relying on the forced flow of liquid with contaminants across filter media, the present invention relies on relatively low pressure differentials within the porous media and hence relatively low velocities of liquid within and outside of the porous medium; and on upward flow which takes advantage of the effects of gravity on contaminant particles.

It is believed that very low intersticial liquid flow velocity is used within the porous filter medium in a vertical upward flow, allowing what applicant believes is a non-plugging phenomena, although applicant does not wish to be restricted to any theory of operation. A porous medium permeable to liquid has internal interconnected pores which could be visualized a "pathways" to liquid flow which are non-plugging if they stop particles by surface deposition and plugging if they separate particles from the liquid-solid flow. It is believed that low velocity intersticial flow improves surface deposition and the vertical upward liquid flow allows the pores to operate as "check-valves" for liquid flow—as the flow stops in one pathway due to the plugging or a pore, gravity pulls down the liquid and particles, unplugging the pore entry or exit, then differential pressure regains liquid flow until the pore gets plugged again starting the cycle. Eventually, some particles pass through the filter medium and exit with the liquid, but the important result is that they do not clog the medium and liquid continues flowing at an almost constant flow rate.

It is an object of the present invention to provide methods and apparatuses for liquid purification.

It is an object of the present invention to provide a method and apparatus for open siphoning.

It is an object of the present invention to provide a method and apparatus for separating liquid from undissolved solids with minimal liquid flow obstruction due to cake formation.

It is another object of the present invention to provide a method and apparatus for separating liquid from undissolved solids while controlling the gas contacting the liquid and the medium.

It is an additional object of the present invention to provide a method and an apparatus for separating a liquid for undissolved solid particles through a porous medium open siphon, enclosed or non-enclosed.

It is another object of the invention to provide a method and an apparatus for treating, filtering or purifying a liquid in an easy and economical manner with a wide range of successful applications.

It is another object of the invention to provide a method and an apparatus for treating, purifying or filtering a liquid wherein the flow rate is enhanced by decreasing the pressure of a gas contained within the filter.

It is a further object of the invention to provide a method and an apparatus for treating, purifying or filtering a liquid with minimal evaporation.

It is another object of the invention to provide a method and an apparatus for treating liquid wherein a gaseous atmosphere of a desired composition contacts an open porous medium siphon.

It is an additional object of the present invention to provide an open siphon apparatus and method which utilizes portions of porous media therein with differing pore size.

It is a particular object of the present invention to provide such an apparatus and method for open siphoning which utilizes an open siphon having porous core material with a larger pore size than the material surrounding the core. Another particular object of the present invention is the provision of an apparatus and process for open siphoning in which the open siphon has porous core material and a plurality of layers surrounding the core material, the core material having a larger pore size than any of the surrounding layers and the pore sizes of the surrounding layers decreasing with distance away from the core.

Another object is the provision of a porous medium siphon in which different portions of the medium have different porosities or are of different material.

Another object of the present invention is the provision of an open siphon filter which need not have the fluid to be filtered forced through the filter media.

A further object of the present invention is the provision of an open siphon filter which can take advantage of some of the contaminants to be filtered to produce a porous cake for flow of fluid and for filtration.

Yet another object of the present invention is the provision of a process and apparatus for forming a permeable mass or clogged area for providing flow to a siphon filter and for providing some filtration.

Another object of the present invention is the provision of an open siphon filter and method for its use which can be used with undissolved solids which settle out, float, or are suspended within the fluid to be filtered.

A further object of the present invention is the provision of apparatus and methods for separating undissolved solids from a liquid by forming a loose permeable mass or cake of the undissolved solids in, adjacent to, or about a porous medium partially emplaced in the liquid and flowing the liquid with undissolved solids through the porous medium at a low enough velocity to form the loose mass or cake.

A further object of the present invention is the provision of an open siphon filter which permits relatively long use of a filter element for a prolonged period of time due to the non-plugging filtration effects provided by the open siphon filter according to the present invention.

An additional object of the present invention is the provision of an apparatus and method for either an open siphon or an open siphon filter in which no differential pressure across the siphon or filter media is required to wet the siphon intake (other than capillary action force).

Other objects of the present invention include apparatuses and methods for their use directed to: cooling liquids; purifying liquids by action similar to but not identical to siphoning; biological or microbiological organism separation or treatment; radiation defection regarding liquids; radiation treatment of liquids; and purification of a two-phase liquid or of one phase of a multi-phase liquid combination.

Other particular objects of the present invention include the provision of open siphons and open siphon filters and apparatus for use with respect to: brine transport and filtration particularly well brine; radiating transported fluid/solids within the siphon; measuring radiation levels of transported fluid/solids; raising liquids to higher levels; and separating coal from an aquious solution of sodium hydroxide or potassium hydroxide.

Other objects and advantages of the invention will be clear to those skilled in the art who have the benefit of this invention's teachings.

This application and accompanying drawings show preferred embodiments of the invention and suggest various alternatives and modifications of the invention. These are not exhaustive and other changes can be made within the scope of the invention. The suggestions in this application are included so that others skilled in the art will more fully understand the invention.

DESCRIPTION OF THE DRAWING

FIG. 2 is a side view of another embodiment of the invention wherein the gaseous atmosphere in contact with the porous medium can be modified in its pressure and composition.

FIG. 3 is a perspective view of a porous medium configured as a siphon.

FIG. 4 is a perspective view of a porous medium plate configured as a siphon.

FIG. 5 is a schematic view of parallel pathways contemplated by the parallel pathway model describing the deposition of undissolved solid particles in a porous medium.

FIG. 6 is a schematic view in cross-section of porous material for a better understanding of the open siphon separation process.

FIG. 20 is a partial isometric perspective partially cut-away vies. FIG. 21 is a top plan view. FIG. 22 is a side view with the inner spiral shown in dotted lines. FIG. 23 is an isometric view of the apparatus. FIG. 24 is a side schematic view of the apparatus as shown in FIG. 23.

DESCRIPTION OF THE PREFERRED EMBODIMENTS

Figure 1:
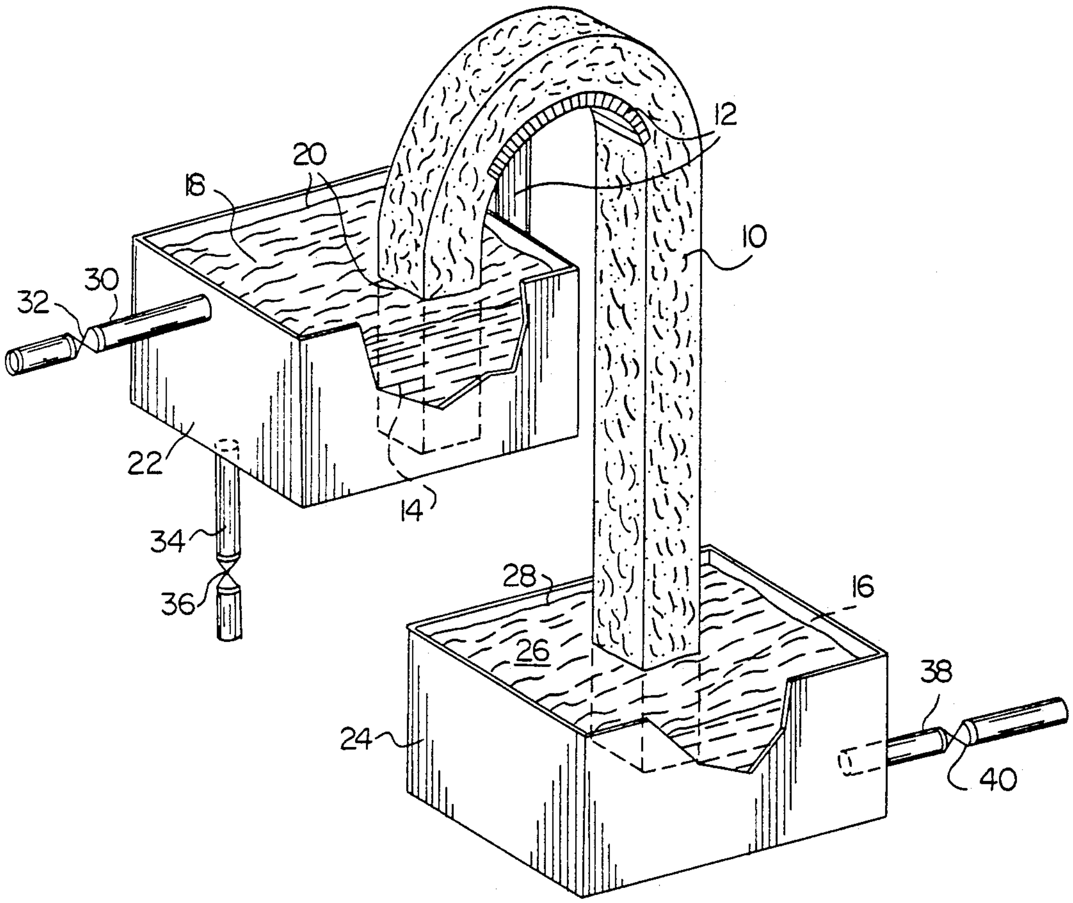
FIG. 1 is a perspective view showing an embodiment of the invention.

Referring to FIG. 1, numeral 10 designates a siphon member of an amount of a porous medium. The filter media useful in all the embodiments of this invention can be, but is not limited to, granular media, fabric media, fibrous, fibril materials, or filamentous materials. These media can be, but are not limited to, inorganic or organic materials; biological organism selective materials natural or synthetic materials; e.g., including but not limited to cotton, wool, polyester, fiber glass, metal, or blends or mixtures thereof. The fabric media can be woven or nonwoven (e.g. air laid webs), or mixtures or combinations of sheets or portions thereof or interleaved sheets thereof.

The medium 10 is preferably shaped as a siphon with:

A portion defining an intake end 14,

A portion defining a discharge end 16,

Suitable support elements 12.

The outer surface being substantially uncovered.

Siphon member 10 is placed between upper vessel 22 and lower vessel 24 with the intake end 14 preferably in contact with the bottom of upper vessel 22. Height adjustable support elements 12 may be fixed at the surface level of the liquid in upper vessel 22. The discharge end 16 preferably contacts the bottom of lower vessel 24.

Lower vessel 24 is below vessel 22. Siphoning action is maintained between liquid 18 contained in vessel 22 and liquid 28 in vessel 24.

Valve 32 (in inlet 30) opens; liquid 18 having undissolved solid particles 76 is introduced into vessel 22 until liquid level 20 is close to the top of vessel 22; then, valve 32 closes. Liquid 18 wets the intake end 14 and enters the porous media of the member 10 at liquid surface level 20. Liquid 18 rises through the porous media of member 10 above level 20 to the top portion of the porous media of member 10. The bent portion of the porous media of member 10 directs liquid flow downward toward discharge end 16. Siphoning takes over once liquid flow passes liquid level 20 on the downside portion.

Filtered liquid 28 exits discharge end 20 into lower vessel 24. At this point, valve 32 and valve 40 (in outlet 38) may be adjusted to maintain a preferred flow rate through the filter. In batch operation, valve 32 remains closed until a new batch of liquid 18 is required for filtration.

In cases in which dissolved solids settle downwardly rather than float to the surface, drain valve 36 in drain 34 opens for drainage of settled solids 76 at bottom of vessel 22. In cases in which solids float to the liquid surface, conventional surface solids removal means may be used.

The porous media of member 10 may be primed by saturating the media with prefiltered liquid if desired. Although preferably in contact with liquid in vessel 24, discharge end 16 may be left suspended over vessel 24 so that liquid 28 falls from discharge end 16 into vessel 24. Liquid level 20 and support 12 may be adjusted so that the bent portion of the member 10 is in contact with surface level 20.

Liquid 18 enters member 10 at liquid level 20 starting the separation process by drawing liquid away from the uppermost liquid layers. These clean supernatant layers have the lowest particle content, and generally the smallest size particles. Most of the fluid-solids separation occurs where the liquid level 20 contacts the porous media of member 10. The liquid layer having the smallest number of particles 78 flows upwardly through the porous media of member 10 by low velocity laminar flow, depositing the entrained particles 78 into the pores 64 of plugging pathway 60 and on the surfaces 66 of the non-plugging pathway 62, seen in FIG. 5.

Figure 1A:
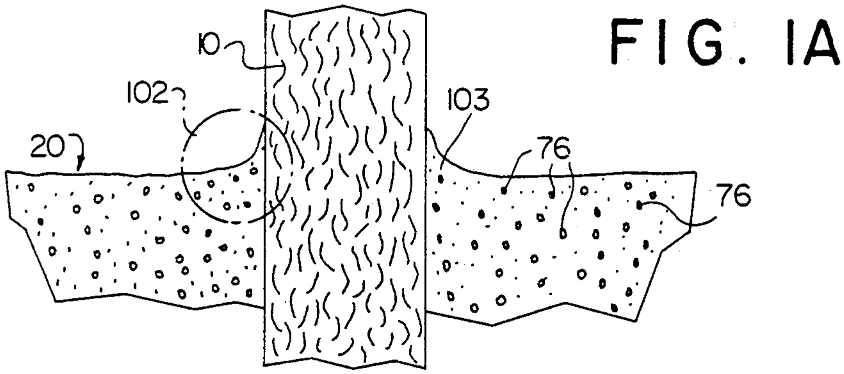
FIG. 1A is a schematic view of a permeable mass formation at the liquid surface/porous medium interface.

FIG. 1A shows the formation of permeable mass 103 at or near the liquid surface/porous medium interface 102. Most particles 76 are stopped at this point. They form an additional permeable mass through which, and over which, liquid may flow and be filtered.

The porous media of member 10 can be configured in many forms and may have any cross-sectional area to fit any particular application. FIG. 3 shows a cylindrically shaped siphon member. FIG. 4 shows a rectangular shaped member. Also, the media may be made of a composite of several materials having different characteristics, porosities and permeabilities to fit any particular application as shown in, e.g., FIGS. 8 and 9.

Referring to FIG. 2, the same elements of the structure shown in FIG. 1 are designated with the same numerals. An enclosure 42 isolates an inner gaseous atmosphere 52 which contacts the porous medium of member 10 and liquid 18. That is, enclosure 42 permits modification and control of the pressure, the temperature, and the composition of inner atmosphere 52. An inlet 48 may be provided to inject different compositions of gas, to attach a pump for changing the pressure of the gas between the housing and the medium, or to attach an apparatus 101 for control of the temperature of the gas (or for recirculation of the gas) between the housing and the medium. By controlling the temperature of the gas, the temperature of the liquid can be raised, lowered, or maintained so that the liquid exiting from the outlet is at a desired temperature. By appropriate sizing of the amount of media and its length above the liquid level, a desired amount of cooling can be effected.

The temperature control may take a variety of forms. It is shown in FIG. 2 as one which heats or cools the gas before the gas enters the housing, but it could take other forms such as heating and cooling coils surrounding the housing. Additionally, the pressure, temperature and composition of the gas may be controlled by a plurality of individual controls, or by a single control apparatus.

Although ends 44 and 46 of enclosure 42 are shown immersed in liquids 18 and 26, this is only to provide a seal for inner atmosphere 52. The enclosure is not intended to work as a siphon. It is desired that the liquid does not flow through the inner space occupied by the atmosphere 52, but only through the porous medium of member 10. Enclosure 42 may take a variety of forms, and it may also completely enclose vessels 22 and 24. Additionally, where enclosure 42 is formed as shown in FIG. 2 enclosing only member 10, a separate container may be used to enclose both vessels 22 and 24 and enclosure 42.

FIG. 6 shows outer surface 70 of the porous medium of member 10 in a schematic cross-section as being formed by many filaments 72. The outermost layer of liquid 74 flowing through the porous medium defines the area of flow through it. It is understood that this area is smaller than the cross-sectional area of the porous medium of member 10. Flow rate of liquid may be enhanced by decreasing the pressure of the gaseous atmosphere in contact with the medium. This permits the area of flow 74 to extend closer to outer surface 70. As deposits of particles 78 grow, liquid displaces to new pathways available within the porous media of member 10. Additionally, or alternatively, pressure can be varied on the surface of the liquid in one or both of the reservoirs or vessels to increase or decrease the rate of flow through the medium, as desired. The flow rate may also be varied by increasing or decreasing the hydraulic gradient.

Figure 8:
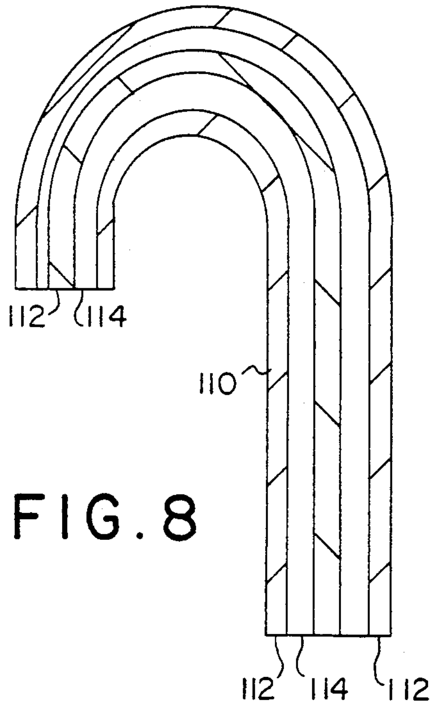
FIG. 8 is a cross-sectional view of multi-component porous medium according to the present invention having materials with pores of differing sizes.
Figure 9:
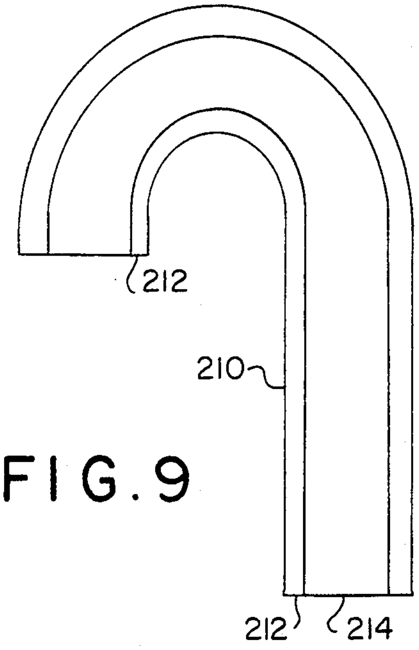
FIG. 9 is a cross-sectional view of dual component porous medium according to the present invention having materials with pores of differing sizes.

As shown in FIG. 8, a siphon member 110 may be made from material of different pore sizes. The material 112 (indicated by crossed lines) has a pore size smaller than that of the material 114. The siphon member 210 shown in FIG. 9 has an outer shell of material 212 with pores smaller than the pores of the inner material 214. Any desired number of layers of increasing, alternating or different pore size may be employed.

Capillary action in the porous material can be utilized and enhanced to aid in the lifting of liquid into the porous medium by using alternating concentric layers, areas or shells of material of larger and smaller pore sizes. The height of the capillary rise of a liquid in a porous permeable material is inversely proportional to the pore size. Liquid can be supported in material of small pore size against the force of gravity much more effectively than in material of large pore size. This in turn can help support liquid in material of larger pore size in a member having layers of material of differing pore size.

Flow and filtration are enhanced in the areas of material of large pore size while capillary lift is enhanced in the areas of material of smaller pore size. Alternatively, the siphon member can be constructed of successive layers (two or more; two shown in FIG. 9) of material of increasing pore size toward the center so that capillary action and equilibrium produce a greater amount of fluid flow and a flow of fluid of larger physical dimensions.

Figure 7:
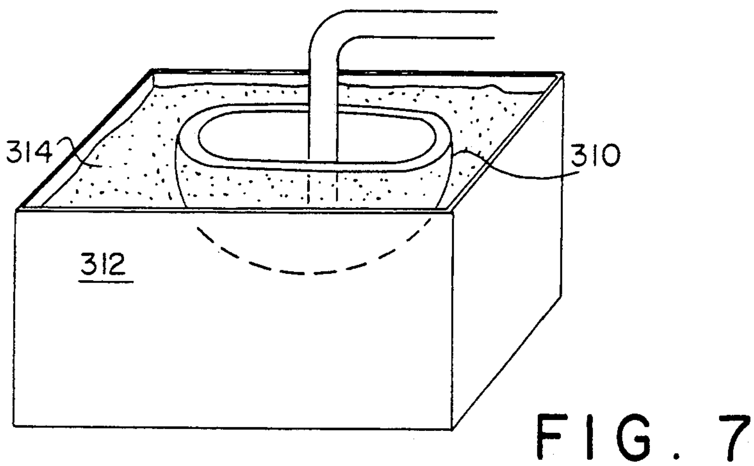
FIG. 7 is a view of an embodiment of the present invention wherein the porous medium is configured as a bowl.

FIG. 7 illustrates another configuration for the porous media. A bowl-shaped member 310 of porous media is mounted in the vessel 312 containing the liquid 314 to be filtered and siphoned. The liquid flows through the porous member 310 and may be conveyed from the interior of the member 310 by siphonage with an appropriate arrangement of apparatus. The siphon means may be an open siphon or a porous medium siphon filter according to this invention.

Figure 10:
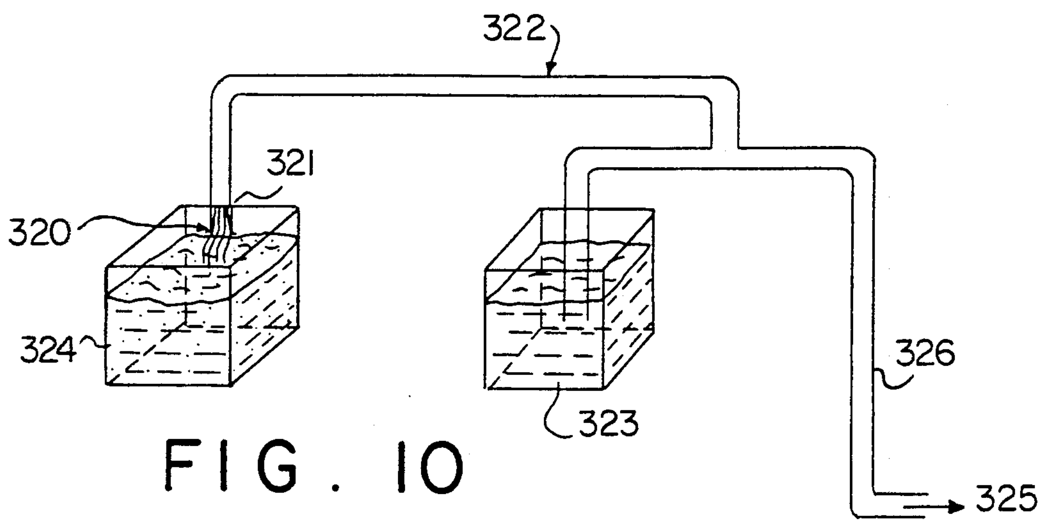
FIG. 10 is a perspective view of another apparatus and method according to the present invention.
Figure 11:
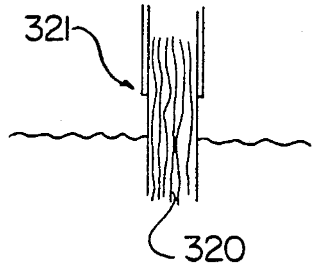
FIG. 11 is a perspective view of the hose end with porous media of apparatus of FIG. 10.

The embodiment of the invention shown in FIGS. 10 and 11 produces liquid (water) filtered and purified by the porous media 320 mounted in an end 321 of the hose 322. The siphoning action through the hose 322 and its discharge portion 326 with the discharge end 325 creates a vacuum in the hose 322 coming from container 324. This vacuum draws liquid from the container 324, through the porous media 320, through the hose 322, hence partially to the container 323 and partially to the discharge 325. The flow rate obtained in a test of this particular arrangement was less than the flow rate obtained by siphoning with an open siphon member made of porous media. In the arrangement of FIG. 10 there was some air leakage through the porous media, i.e., vacuum inefficiency, but there was liquid flow through the porous media confirming that this method does work. Again, the hose 322 acts as the enclosure 42 of FIG. 1. The porous media should extend at least from within the hose into the fluid, but it may fill the entire length of the conduit or any smaller portion thereof.

Figure 12:
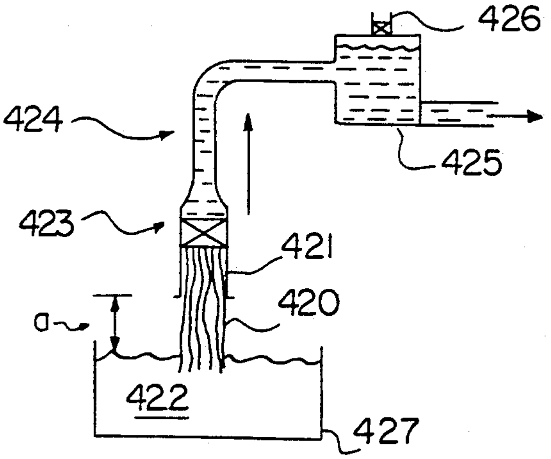
FIG. 12 is a perspective view of another apparatus and method according to the present invention.

FIG. 12 illustrates another arrangement of apparatus for use in the system of FIG. 10. Porous media 420 is connected to the end of hose 421 and extends into liquid 422 which is to be moved and cleaned. The height "a" from the top of the liquid to the bottom of the hose 421 should be equal or less than the capillary rise of liquid in the porous media 420. A check valve 423 may be employed in the hose 421 to insure that a minimum desired pressure is reached. To balance any volume loss for decreased liquid flow at the porous media, the hose may have a portion 424 of reduced diameter. A pump (not shown) is used to pump liquid 422 through the porous media 420, hose 421, check valve 423. Hose portion 424 can be provided with a level control to activate the pump. A valve 426 can be provided at the top of the tank 425 to purge gas collecting in the tank. The pump could be reversed to provide a backwashing action to clean the porous media. Similarly cooling can occur in media 320 in the apparatus and method of FIG. 10. The length "a" of the porous media 420 serves as a cooling area (primarily by evaporation) if the liquid 422 is to be cooled so that the liquid in the tank 425 is cooler than the liquid 422 prior to its movement from the container 427.

Figure 13:
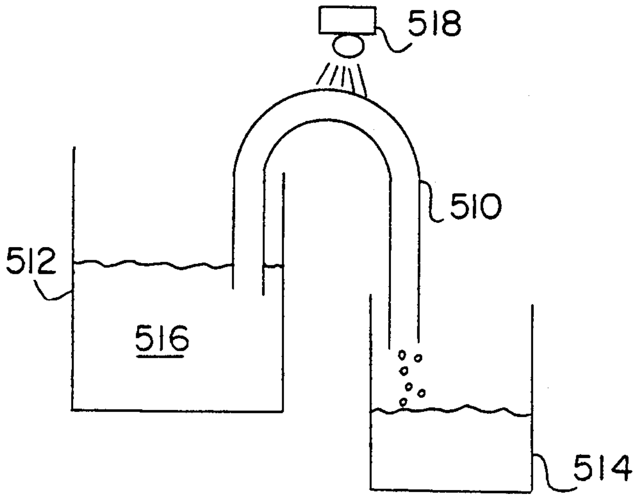
FIG. 13 is a schematic side view of another embodiment of the present invention showing apparatus and method using a radiation source to radiate an open siphon and its contents.

The embodiment of the present invention shown in FIG. 13 has an open siphon comprised of the porous medium member 510 which extends from an upper liquid-containing vessel 512 to a lower liquid-receiving vessel 514. The liquid 516 flows from the vessel 512 through the siphon 510 and into the vessel 514. The radiation source 518 provides radiation (included but not limited to neat, infrared, x-ray, light, gamma, beta, and ultraviolet)to the siphon member 510 and to its contents. If desired, the porous media of the member 510 can be comprised in whole or in part of translucent or transparent materials, granules, fibers, fibrils, or filaments which more readily transmit various types of radiation; e.g. ultraviolet radiation transmitted by the radiation source 518 could be used to kill bacteria or other undesirable living organisms within a member 510 comprised of transparent fibers. Such a device is useful in the treatment of bacteria-containing waste water or well fluids. Of course, if desired the open siphon member 510 can be comprised of porous media which provide filtration in addition to siphoning and the radiation could be directed to the material discharged from the siphon.

Figure 14:
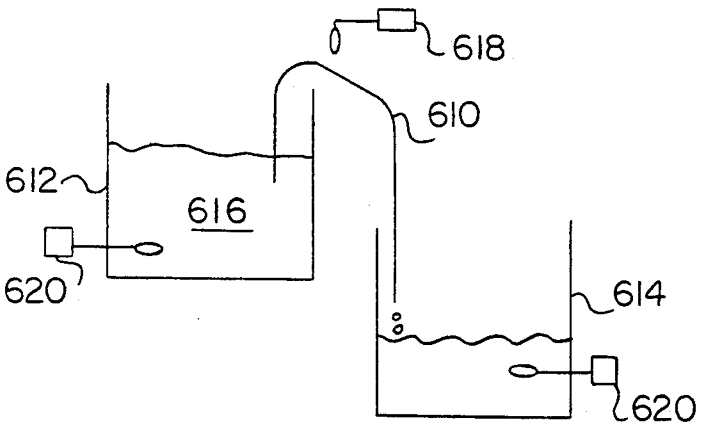
FIG. 14 is a schematic side view of another embodiment of the present invention showing apparatus and method using radiation detectors at various locations.

In another embodiment of the present invention illustrated in FIG. 14, a radiation detector (for detection, inter alia, any sort of radiation, included but not limited to heat, x-ray, infrared, ultraviolet, gamma, and beta) is employed for safety purposes. An upper vessel 612 contains radioactive liquid 616 such as fluid from a nuclear reactor. An open siphon member 610 conducts the liquid 616 from the upper vessel 612 to a lower vessel 614. The radiation detector 618 (e.g. a Geiger counter) senses the radiation level of the contents of the siphon member 610. Another detector 620 can be employed in the liquid within the vessels. Of course a detector can be disposed to detect radiation in the material discharged from the siphon.

Figure 15:
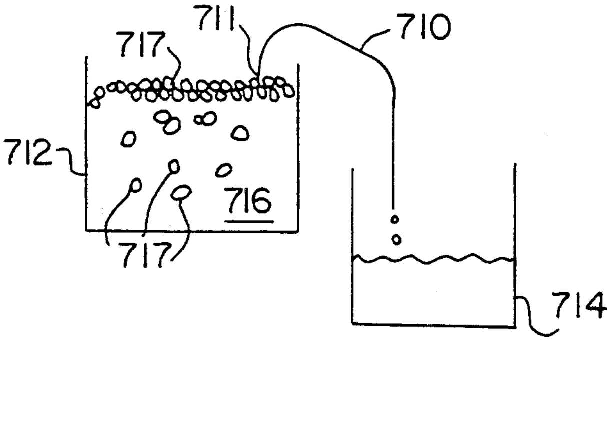
FIG. 15. is a schematic side view of an embodiment of the present invention useful with liquids having undissolved solids which float.

In many processes for dealing with liquids having undissolved solids, the solids float to the top of the liquid during processing. Apparatuses and processes according to the present invention are helpful in such processes (for example in filtering fluids in the Gravimelt Process for the desulfurization and demineralization of coal.) A process in which solids float to the top of a liquid is shown in FIG. 15. A porous open siphon filter 710 extends from an upper vessel 712 to a lower vessel 714. The liquid 716 contains undissolved solids 717 some of which have floated to the top of the liquid surface in the vessel. The major portion of the solids 717 are prevented from entering the vessel 714 by the action of the siphon filter 710 (and a permeable mass formed at the interface 711 if it is formed).

Figure 16:
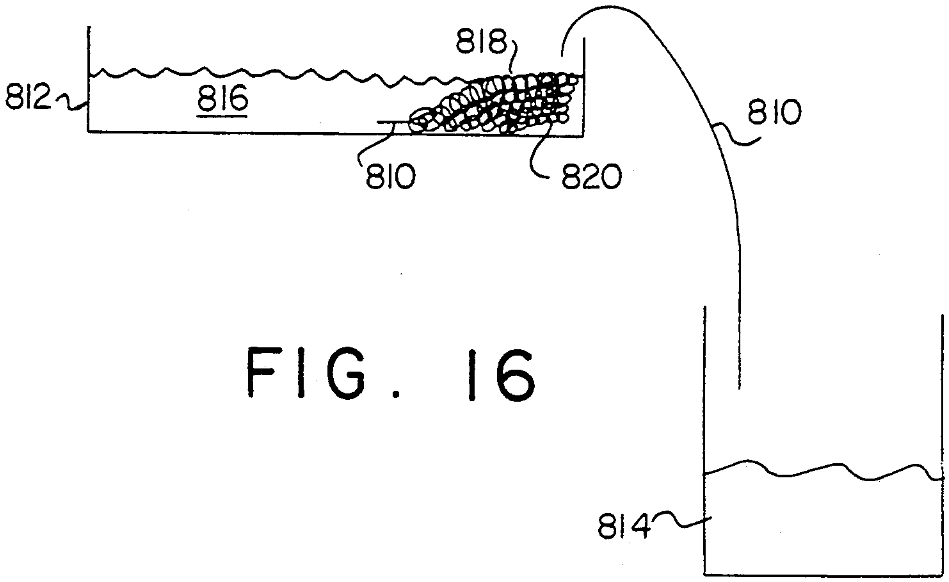
FIG. 16 is a schematic side view of an embodiment of the present invention showing the formation of a useful porous mass.

FIG. 16 illustrates the formation of a permeable mass 818 about an end 820 of an open siphon filter member 810 which extends from an upper vessel 812 to a lower vessel 814. The mass is formed by undissolved solids in a liquid 816 in the upper vessel 812. As the siphon works, the size of the mass increases, but due to the lack of compressive force (other than the forces of siphoning and capillary action) the mass remains porous and flow through it continues. The mass itself serves to stop and hold undissolved solids to enhance the filtration effects of the open siphon.

The present invention provides apparatuses and processes which are useful with liquids or with fluid-containing masses such as gels or muds. A siphon or purification device according to the present invention can be used to remove non-connate liquid from a mass such as a gel or mud or other similar masses or agglomerations of materials.

Figure 17:
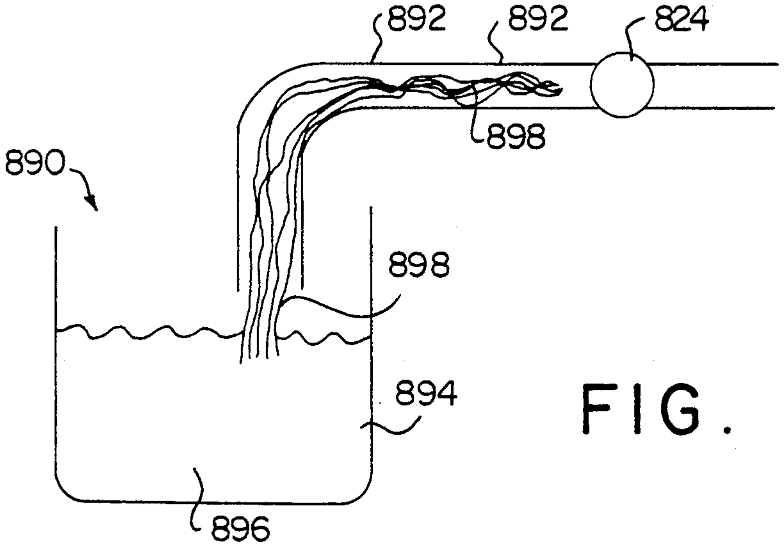
FIG. 17 is a schematic side view of an embodiment of a system according to the present invention.

As illustrated in FIG. 17, a system 890 according to this invention need not employ an inverted "U" siphon, but may employ a conduit 892 with a suction or differential pressure creating device 824 for providing differential pressure to cause a liquid 896 (contaminated with undissolved solids) in the container 894 to flow into and through a porous medium 898 and the conduit 892.

Figure 18:
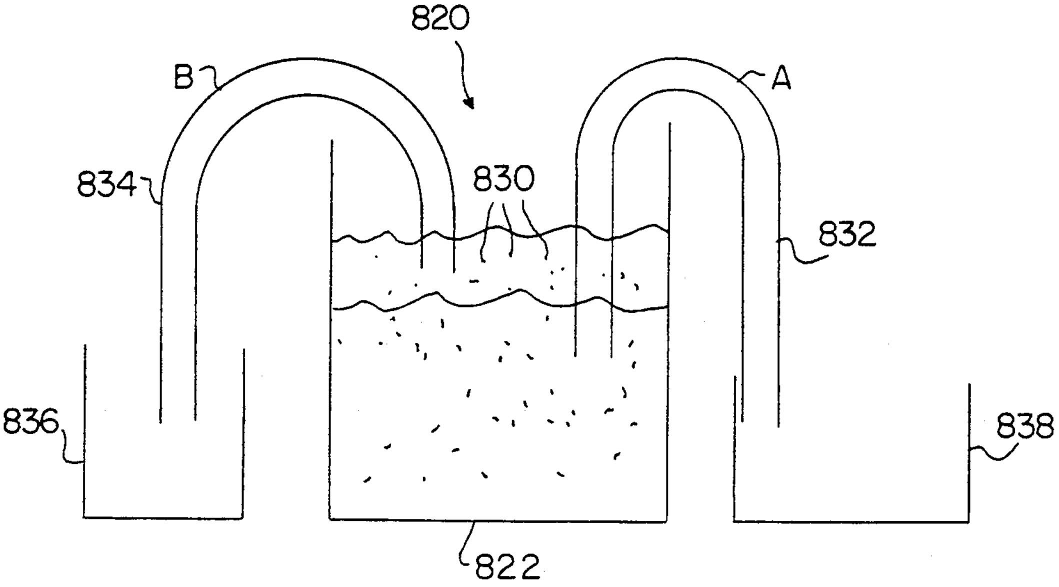
FIG. 18 is a schematic side view of an embodiment of an apparatus according to the present invention for transporting one or more phases of a two-phase system.
Figure 19:
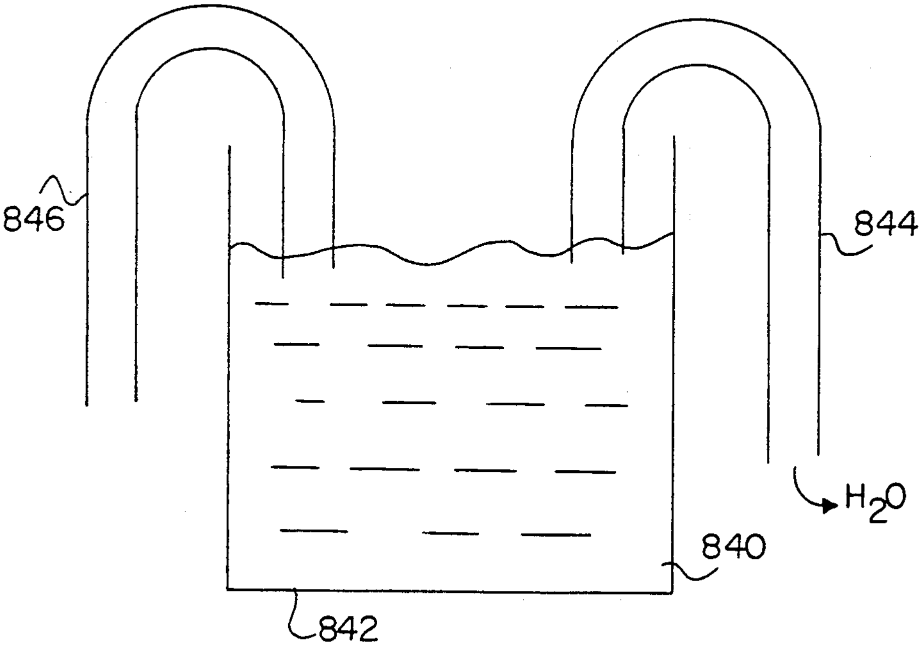
FIG. 19 is a schematic side view of an apparatus according to the present invention for transporting one or more components of an emulsion.
Figure 20:
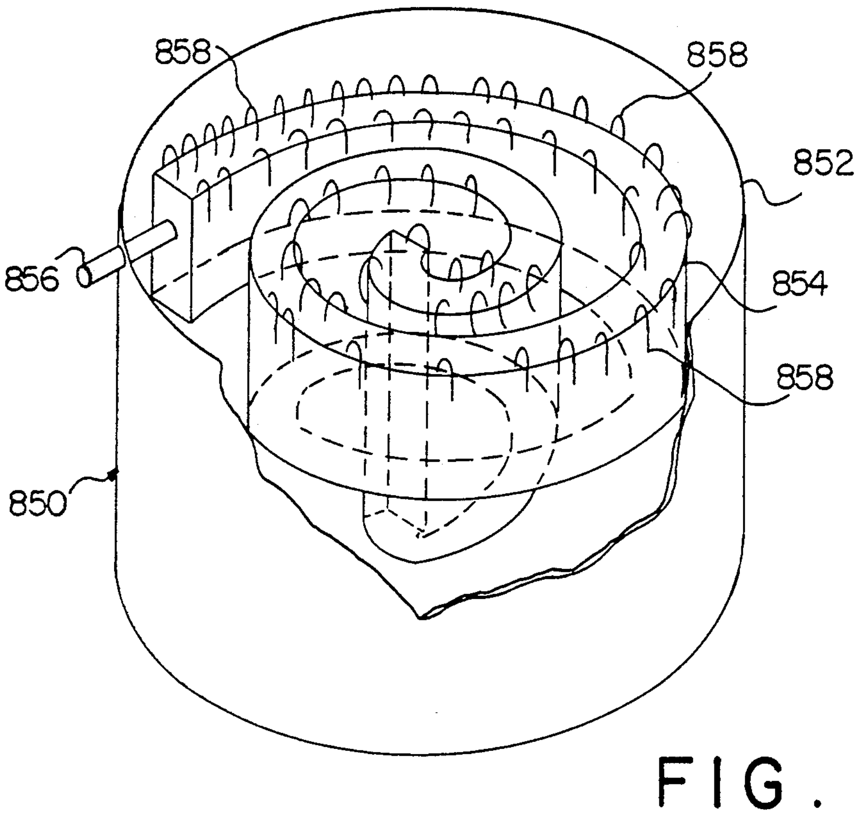
FIG. 20-24 are views of an apparatus according to the present invention for purifying a liquid.
Figure 21:
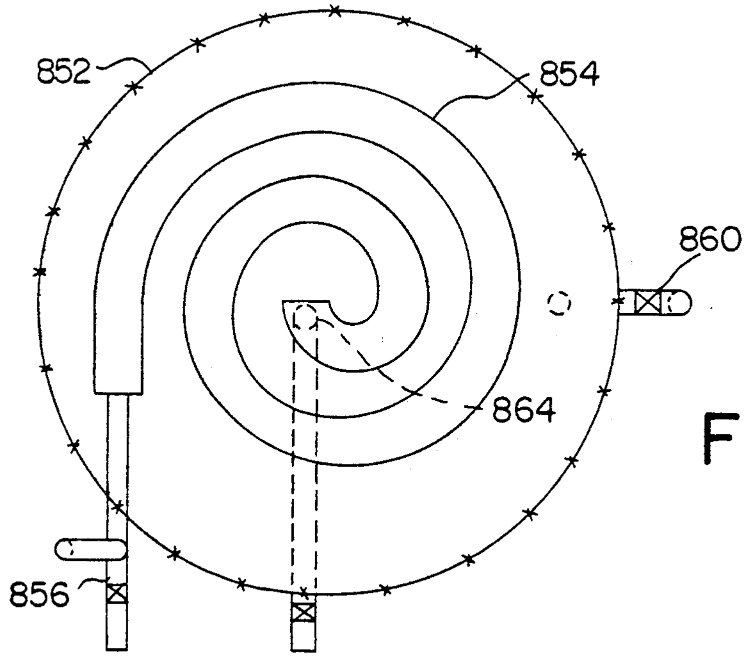

FIG. 18 illustrates an embodiment of the present invention in which liquids such as oil and water in a two-phase liquid combination are purified. The device 820 according to the present invention has a container 822 containing a two-phase liquid with one phase 824, an oil phase, above another phase 826, a water phase. Each liquid is contaminated with contaminate particles 828 and 830, respectively. A porous medium siphon 832 primed with water prior to its insertion into the liquid, extends through the oil 824 into the water 826. Another porous medium siphon 834 extends into the oil 824. The siphon transports purified oil from the container 822 into the container 836 and the siphon 832 transports purified water into the container 838. Of course only one porous siphon may be employed to purify only one liquid or one liquid or more of a multi-phase combination may be purified by using the appropriate number of siphons. As shown in FIG. 19 a component of an emulsion 840 of oil and water may be transported from a container 842 of the emulsion by porous siphons 844 and 846. For example, porous siphon 844 when primed with water removes water from the emulsion and porous siphon 846 primed with oil removes oil from the emulsion. For a particular system the siphon can be replaced by a separation member for transmitting the liquid at least partially by capillary action and for trapping the undissolved solids. The separation member can be specific to the liquid desired to be separated, i.e. phobic to all other liquids in the system or unsuitable for transmitting all other liquids in the system; or it can be primed with the liquid desired to be transmitted.

Figure 22:
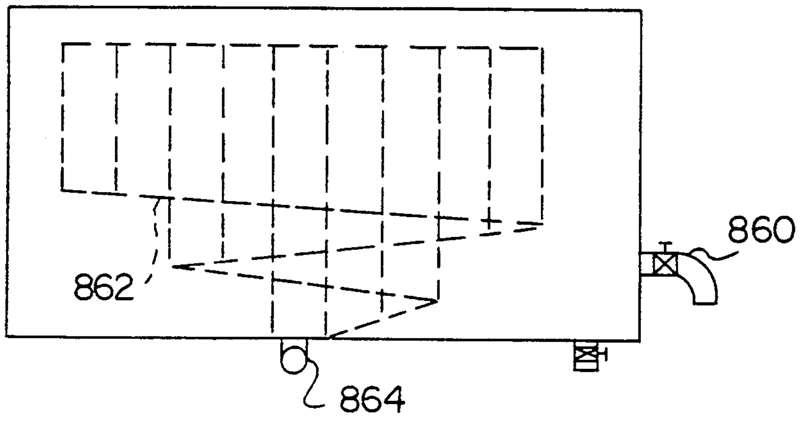
Figure 23:
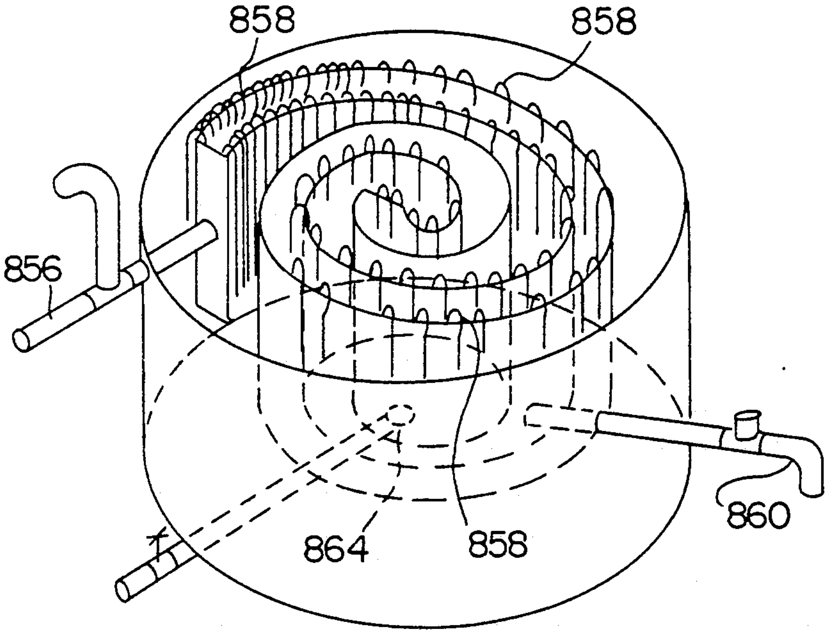
Figure 24:
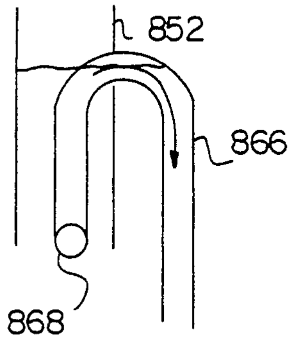

FIGS. 20–24 illustrates a liquid purification system 850 according to the present invention. The system 850 includes a purified liquid collection tank 852 through which a liquid transport spiral trough 854 extends The liquid with contaminants to be purified is fed into an inlet 856 to the trough 854. A plurality of porous medium siphons 858 extend into the trough 854 and up and over the trough's top edge so that fluid siphoned from inside the trough falls into the collection tank 852 Purified liquid can be removed from the tank 852 via the outlet 860 (FIG. 22). FIG. 22 is a cross-sectional view of the system 850 and it shows an inclined bottom portion 862 of the trough 854 to facilitate the movement of contaminants along the trough to a contaminant removal orifice 864 in the bottom of the interior end of the trough 854. The liquid level in the system 850 can be maintained with an overflow pipe 866 in communication with a conduit 868 which in turn communicates with the tank 852 (see FIG. 24). The bottom of the pipe 866 is open so that if the level of liquid in tank 852 exceeds the desired level, the excess liquid flows out of pipe 866 to maintain the desired liquid level.

Figure 25:
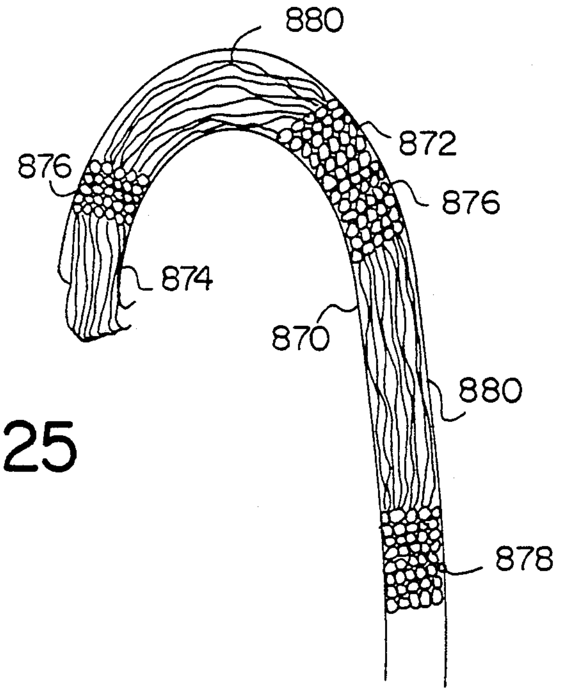
FIG. 25 is a cross-sectional view of a porous medium siphon according to the present invention.

As shown in FIG. 25 a porous medium siphon according to the present invention can include materials for different type and different porosites and permeabilities at different locations in the siphon. The porous medium siphon 870 having a walled conduit 872 along part of its length has metal fibrils 874 at one end, granular material 876 at various locations, a permeable membrane 878, and polyester fibers 880. Of course, as desired different materials in different configurations may be present at different areas of the siphon.

Figure 26:
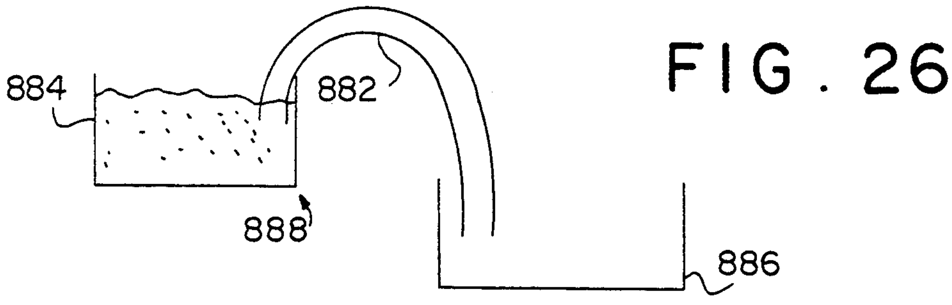
FIG. 26 is a schematic side view in cross-section of a system according to the present invention.

FIG. 26 illustrates a system 888 according to the present invention having a siphon 882 for purifying liquid and moving it from tank 884 into container 886. The porous medium siphon 882 is made from hardened yet porous material (e.g., but not limited to, various clays).

An actual test of an embodiment of the present invention was conducted by the Pall Well Technology Corporation which confirmed the efficiency of an embodiment according to the invention and indicated how favorably it performed.

Figures 27, 28:
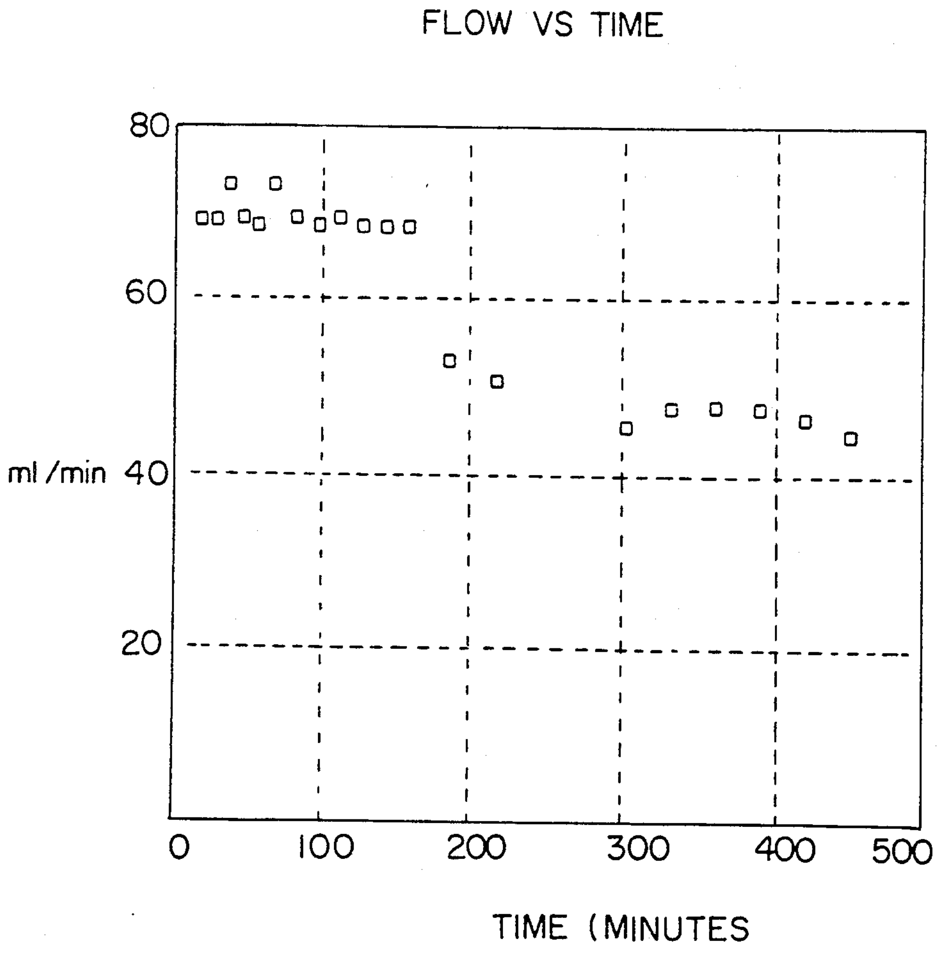
FIG. 27 presents data Table I.
FIG. 28 presents a graph of flow vs. time for one embodiment of the invention.
Figure 29:
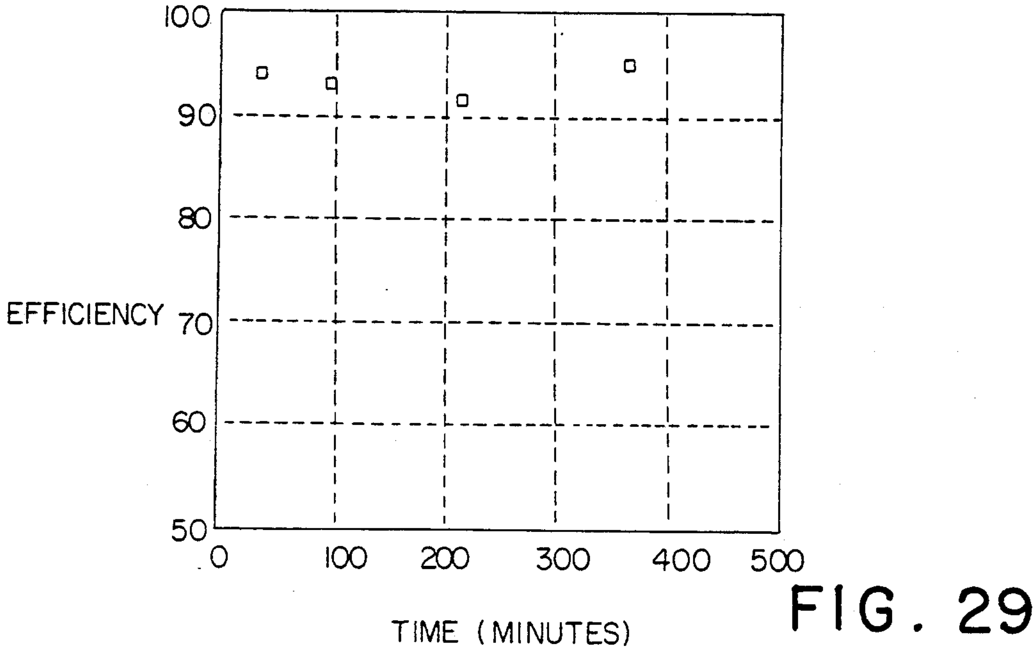
FIG. 29 presents a graph of efficiency vs. time for this embodiment.

The embodiment tested had a siphon with an outer shell consisting of a porous polyvinyl alcohol sponge cartridge filter and an internal fibrous material of aquarium filter grade polyester. A test suspension of AC Fine (100 parts per million) was used to challenge the filter to determine filtration efficiency and flow rate. The test was run for over 7 hours with an initial flow rate of 76 milliliters per minute which decreased to 44 milliliters per minute (FIG. 28). Filtration efficiency was determined gravimetrically. The efficiency of the filter averaged 92.9% throughout the 7 hour experiment, ranging from a low of 91.0% to a high of 94.5%. The gravimetric efficiency history is shown in FIG. 29.

Figure 30:
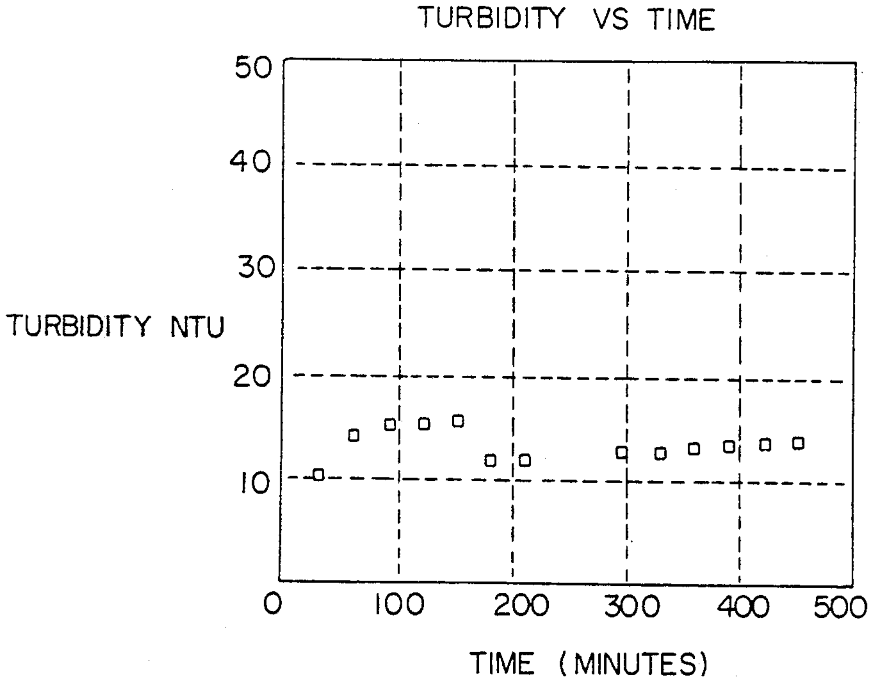
FIG. 30 presents a graph of turbidity vs. time for this embodiment.

As a separate indication of filtration efficiency, turbidity measurements were made on the influent as well as several of effluent samples. The turbidity of the influent was 43.2 NTU with an average effluent turbidity of 12.8 NTU. The effluent quality was fairly constant throughout the life of the experiment as depicted in FIG. 30. A particle size distribution was determined on the influent and an effluent sample at 90 minutes (FIG. 27). The filter exhibited total filtration of particles greater than 5 microns in size. The filter exhibited a fairly constant flow rate over an extended time period coupled with a high and constant efficiency.

Incorporated herein by reference are Reports I–VIII filed in the parent of this application which deal with various embodiments of the present invention and are disclosed here to satisfy the disclosure requirements of the U.S. Patent Laws and of 37 C.F.R.

Professor E. C. Fitch, an expert in filtration, has referred to embodiments of the present invention as a unique filtration process which is a technological breakthrough. He was impressed by its simplicity, advantages, and application potential.

In conclusion, therefore, it is seen that the present invention and the embodiments disclosed herein are well adapted to carry out the objectives and obtain the ends set forth at the outset. It will be clear to one of skill in this art who has the benefits of this invention's teachings that changes can be made in the method and apparatus without departing from the spirit and the scope of this invention. Such changes might include the use of a separation member of a porous medium in which liquid is transmitted at least partially by capillary action rather than a siphon in each of the embodiments disclosed in which a siphon is described. It should be noted that in a given process it may be the separated undissolved particles which are valued, or the separated liquid, or both. Accordingly, an invention has been disclosed which provides method and means for separation, transmission, and purification of liquids. The present invention, is therefore, well adapted to carry out the objects and obtain the ends and advantages mentioned, as well as others inherent therein.

What is claimed is:

1. A method for separation of particles suspended undissolved solids present in a liquid having a top surface, the method comprising the steps of:

intersecting at least one portion of an open siphon member comprising a porous medium through an interface between the liquid containing the suspended undissolved solids and a gas contacting both the liquid and the porous medium, said porous medium containing a plurality of interconnected internal passageways some of which are dimensioned to plug with particles of the suspended undissolved solids of a given size and some of which are dimensioned to exclude particles of a given size, so that the suspended undissolved solids are either prevented from flowing through the porous medium or are captured by it, controlling the gaseous composition of the gas contacting both the liquid and the porous medium, positioning at least one other portion of said porous medium lower than the top surface of the liquid and outside of the liquid, isolating the gas contacting the liquid, and siphoning the liquid and ejecting from the porous medium the liquid substantially free of the suspended undissolved solids.

2. An apparatus for separating undissolved solids from liquid comprising:

an open siphon member comprising a porous medium open to gas having interconnected internal passageways, suitably shaped to form a guide path for liquid to be removed from on reservoir to a second by siphonage, wherein said porous medium removes at least some of the undissolved particles from the liquid, wherein said porous medium has a plurality of intake and discharge portions positioned such that a hydraulic gradient is formed between said intake and discharge portions such that a siphonage effect is created on the liquid in the region of the interface between the liquid and said porous medium, a housing isolating the gas in contact with said porous medium, wherein gas between said housing and said porous medium may be controlled with respect to pressure, composition, and temperature, means for controlling the pressure of the gas between said housing and said porous medium, means for controlling the composition of the gas between said housing and said porous medium, and means for controlling the temperature of the gas between said housing and said porous medium.

3. An apparatus for separating undissolved solids from liquid comprising:

an open siphon member comprising a porous medium open to gas having interconnected internal passageways, suitably shaped to form a guide path for liquid to be removed from on reservoir to a second by siphonage, wherein said porous medium removes at least some of the undissolved particles from the liquid, wherein said porous medium has a plurality of intake and discharge portions positioned such that a hydraulic gradient is formed between said intake and discharge portions such that a siphonage effect is created on the liquid in the region of the interface between the liquid and said porous medium, a housing isolating the gas in contact with said porous medium, wherein gas between said housing and said porous medium may be controlled with respect to pressure, composition, and temperature, means for controlling the pressure, composition and temperature of the gas between said housing and said porous medium.

* * * * *